C. H. GOEBEL.
FARE-BOX.
No. 172,421. Patented Jan. 18, 1876.
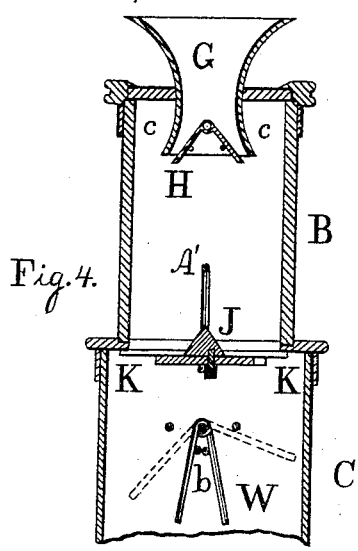
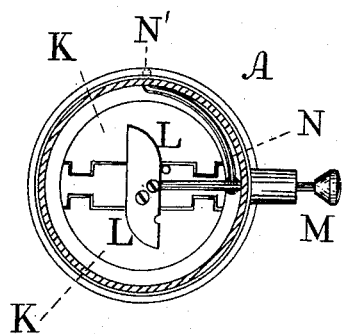
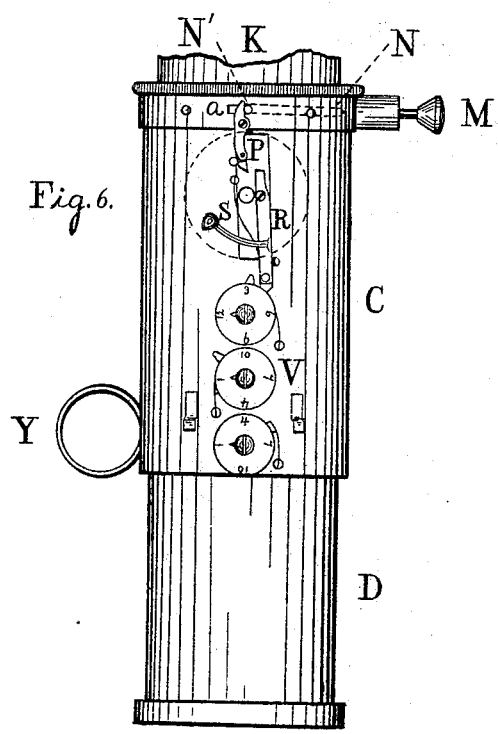
Witnesses
L. F. Brow.
A. P. Grant.
Inventor
C. H. Goebel
by John A. Wiedersheim & Co.
Attys.

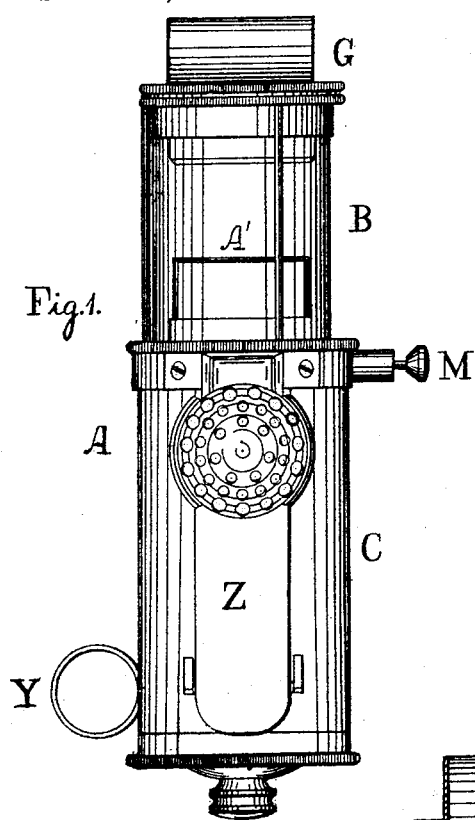
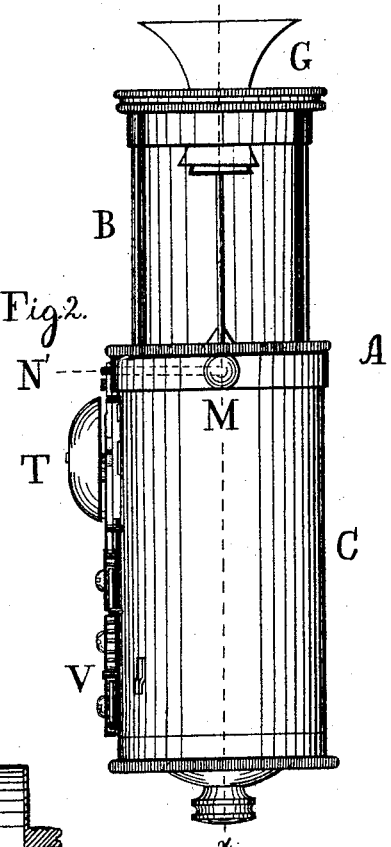
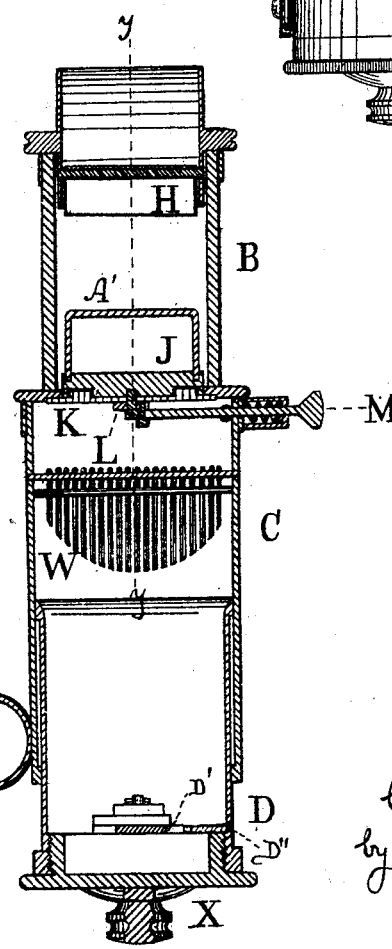

UNITED STATES PATENT OFFICE.

CHRISTIAN H. GOEBEL, OF PHILADELPHIA, PENNSYLVANIA, ASSIGNOR TO THE CHESTER RAILWAY-FARE RECEIVER AND REGISTER COMPANY, OF NEW YORK CITY.

IMPROVEMENT IN FARE-BOXES.

Specification forming part of Letters Patent No. 172,421, dated January 18, 1876; application filed April 25, 1874.

*To all whom it may concern:*

Be it known that I, CHRISTIAN H. GOEBEL, of the city and county of Philadelphia, and the State of Pennsylvania, have invented a new and useful Improvement in Conductors' Fare-Boxes; and I do hereby declare the following to be a clear and exact description of the nature thereof, sufficient to enable others skilled in the art to which my invention appertains to fully understand, make, and use the same, reference being had to the accompanying drawings making part of this specification, in which—

Figures 1 and 2 are side elevations of the device embodying my invention. Fig. 3 is a central vertical section in line $x\,x$, Fig. 2. Fig. 4 is a vertical section of a portion in line $y\,y$, Fig. 3. Fig. 5 is a view of an interior portion. Fig. 6 is a partial view of Fig. 1, the cap of the gong and register being removed.

Similar letters of reference indicate corresponding parts in the several figures.

My invention relates to a portable fare-box, which is of tubular form, and may be grasped bodily by the hand. It consists in the receiver formed of an expansible casing. It also consists in providing the hopper with two leaves, which have a common axis centrally in the hopper, so as to open and close in opposite directions. It also consists in means for preventing the binding or clogging the fares at the base of the inspection-tube. It further consists in a trap at the base of the inspection-tube, for holding the fares and permitting the inspection thereof prior to their passage to the bottom of the receiver. It also consists in a rotary plate carrying the lock, and forming and closing the bottom of the receiving-tube. It further consists in means for simultaneously operating the trap at the base of the inspection-tube, the gong, and registering apparatus.

Referring to the drawings, A represents a casing, which is preferably of cylindrical form, and constructed of the transparent tube B, the main body C, and extensible portion D, the said tube B being at the top or receiving end of the casing, and the extensible portion D at the bottom or discharging end thereof, the body C and portion D being connected by a telescopic joint. A hopper or mouth, G, is placed at the top of the casing A, and opens into the transparent tube B thereof, and within the hopper, at the bottom thereof, there are arranged two leaves, H, which constitute the first trap, and are suspended from a transversely-arranged rod or bar secured to the hopper, and adapted to open downwardly to a certain extent, (see Fig. 4,) for permitting the passage of fares into the transparent tube B of the casing, wherein said fares may be viewed and inspected. At or about the junction of the transparent tube B and body C there is secured a horizontally-arranged cross-bar, J, to the sides of which there are hinged leaves K, which, when in a horizontal position, are adapted to close communication between the parts B C of the casing A, and constitute the middle trap of the casing. A bar, L, is hinged to the under side of the fixed cross-bar J, and is of such dimensions, and so adapted, that when it extends at right angles to the axis of the leaves K it occupies a position beneath said leaves, and supports them in horizontal position; but when said bar extends in line parallel with the cross-bar J, or the axis of the leaves K, the latter lose the support of said bar L, and thus fall, whereby communication is established between the inspection-tube B and main body C of the casing A.

The proper manipulation of the hinged or swinging bar L is accomplished by a spring lever or pusher, M, which is jointed to said bar L, and projects horizontally through the side of the body C. A' represents an upright, which rises from the cross-bar J into the inspection-tube B direct, and occupies a position below the middle of the hopper G. To the spring-pusher M there is secured a curved arm, N, which extends along the inner circumference of the upper portion of the body of the casing, and its end N' is bent laterally and projects outwardly through a slot, $a$, in said body of the casing. (See Fig. 6.) P represents a spring-lever, which is mounted on the outside of the body B, and R represents a similar lever, which is mounted on the body below the lever P, the two levers extending vertically. The upper portion of the lever P is in contact with the projecting N' of the arm N, and the bottom end carries a jointed toe, which, in its forward motion, engages with the upper end of the lever R, and operates the same, and in the other or return motion rides over the same without imparting motion to said lever R. The lever R carries a hammer, S, which is adapted to strike the gong or alarm T, which is supported on a post or staff secured to the outside of the body of the casing.

The bottom of the lever R carries a jointed toe, which properly engages with the wheel or wheels of the dials of a register or registering apparatus, V, which may be of well-known construction.

Suitable springs are applied to the levers P R and their toes, to cause proper operation thereto, and stops will be properly arranged to limit the play of the levers.

Within the body of the casing, below the leaves K, I arrange the lower trap W, which consists of a series of fingers, preferably of wire, which hang from opposite sides of a supporting-rod secured to the body of the casing, and the fingers are jointed to said rod independently of each other, so that each finger is in nowise affected by its neighbor, and when the casing is overturned the former may assume an angle or position regardless of that assumed by the others.

The edges of the fingers may be cut to form a circle of the entire series of the fingers, to conform to the tubular form of the body C, for the purpose of preventing space between said edges and the inner face of the adjacent portion of the body of the casing. The fingers will be prevented from coming together and interlocking by means of suitable stops or rods $b$. X represents a rotary plate, which is screw-threaded, to engage with the threads on the bottom of the casing A, so that said plate may form and close the bottom of the casing. A lock is fixed to the plate, and serves to secure the plate and casing. The plate will be applied to or removed from position by rotation in the proper direction, and as the lock is fixed to the plate X, loss or displacement of the latter cannot occur. The sliding bolt D' of the lock enters a notch or opening, D'', on the inner face of the body of the box. When the bolt is withdrawn from the notch, by properly operating the knob or spindle of the lock, the plate X may be unscrewed from the box, and the interior of the latter is accessible.

Near the bottom of the side of the casing opposite to that occupied by the lever M, I arrange a ring, Y, which extends vertically, and is adapted for the engagement of one of the fingers of the human hand which grasps the body of the casing A. The gong and registering mechanism, and the operating mechanism of both, will be covered by a cap, Z, which will be, preferably, sealed and under lock, so that the receiver who removes the fares from the casing A may be unable to uncover or have access to the registering mechanism, and thus a check may be placed on said receiver. The bottom of the hopper G will project or be below the top of the casing, and is contracted, so that there is a space, $c$, between said bottom and the adjacent portion of the casing.

The operation is as follows: The receiver being properly grasped by the conductor, he carries and presents the same to the passenger for the required fare, which will be deposited in the hopper or mouth without punching or canceling, and drop into the transparent tube B, and lodge on the leaves K, which thus act as a table for holding the fares until viewed or inspected. The upright A' directs the fare from the center of the tube and the cross-bar J, so that the fare drops on the leaves K, and prevents clogging or binding of the fare in the inspection-tube. The conductor then pushes the lever M, thus opening the leaves K, and causing the fare to drop into the body of the receiver. Simultaneously therewith the gong is rung, thus indicating the action of the conductor in depositing the fare, and the registering apparatus V is moved the distance of one, thus recording a fare. On release of the lever M, owing to a spring bearing against the same, the cross-bar L returns to its normal position, and in so doing moves under the leaves K, and elevates and closes said leaves.

The conductor will be supplied with tickets for sale to passengers, and change provided in a manner well known and accounted for. Should the number of fares be large, the portion D of the casing A should be drawn out, thus enlarging the capacity of the receiver.

If attempts are made to remove fare by overturning the receiver, the several fingers W, being independent of each other, assume various angles to each other, and will prevent the return passage of the fare.

Again, the leaves or trap K remain closed in overturning; but if, by any chance, a fare should escape into the inspection-tube, it may be made to occupy the space $c$, but is prevented reaching the inner end of the hopper G, owing to its dimensions and projection into the casing. If the overturned receiver is shaken in order to catch the fare on the bottom of the hopper as inverted, the leaves H close said bottom, and thus further prevent the removal of the fare.

It will also be seen that, the body being of tubular form, the fingers and palm of the hand may be so disposed that the thumb of the same hand is allowed to be free, in order to be available for operating the lever of the table trap or leaves K.

Having thus described my invention, what

I claim as new, and desire to secure by Letters Patent, is—

1. The expansible fare-receiver, constructed of parts fitted to each other telescopically, as stated.

2. The combination, with the hopper, of the two suspended leaves H, having a common axis centrally in the hopper, and opening and closing in opposite directions, all as stated.

3. The upright A', fixed to the cross-bar J of the table-leaves K, arranged and operating as set forth.

4. The hinged leaves K, swinging cross-bar L, and lever M, combined and operating substantially as and for the purpose described.

5. The trap at the base of the inspection-tube, the gong, and registering apparatus, operated simultaneously by the lever M, cross-bar L, and intermediate mechanism, consisting of arm N and levers P R, substantially as and for the purpose set forth.

6. The lever M, operating the bar L of the leaves K, and carrying the arm N, which operates the gong through the intermediate lever P, substantially as and for the purpose set forth.

CHRISTIAN H. GOEBEL.

Witnesses:
JOHN A. WIEDERSHEIM,
A. P. GRANT.